Jan. 10, 1933.  J. W. CHENOWETH  1,893,695

EQUALIZING CHASSIS

Filed March 14, 1930

INVENTOR.
JESSE W. CHENOWETH.
BY
Lockwood, Lockwood, Goldsmith & Galt
ATTORNEYS.

Patented Jan. 10, 1933

1,893,695

UNITED STATES PATENT OFFICE

JESSE W. CHENOWETH, OF LEBANON, INDIANA, ASSIGNOR OF ONE-HALF TO EARL M. HICKS, OF LEBANON, INDIANA

EQUALIZING CHASSIS

Application filed March 14, 1930. Serial No. 435,770.

This invention relates to an equalizing chassis construction.

The chief object of this invention is to diagonally connect wheel mountings on opposite sides of a frame so that there is an equalization between the movements of the wheel supporting structures.

The chief feature of the invention consists in the particular means employed for so-called cross or diagonally connecting wheel mountings upon opposite sides of a chassis.

The full nature of the invention will be understood from the accompanying drawing and the following description and claims.

Figure 1:
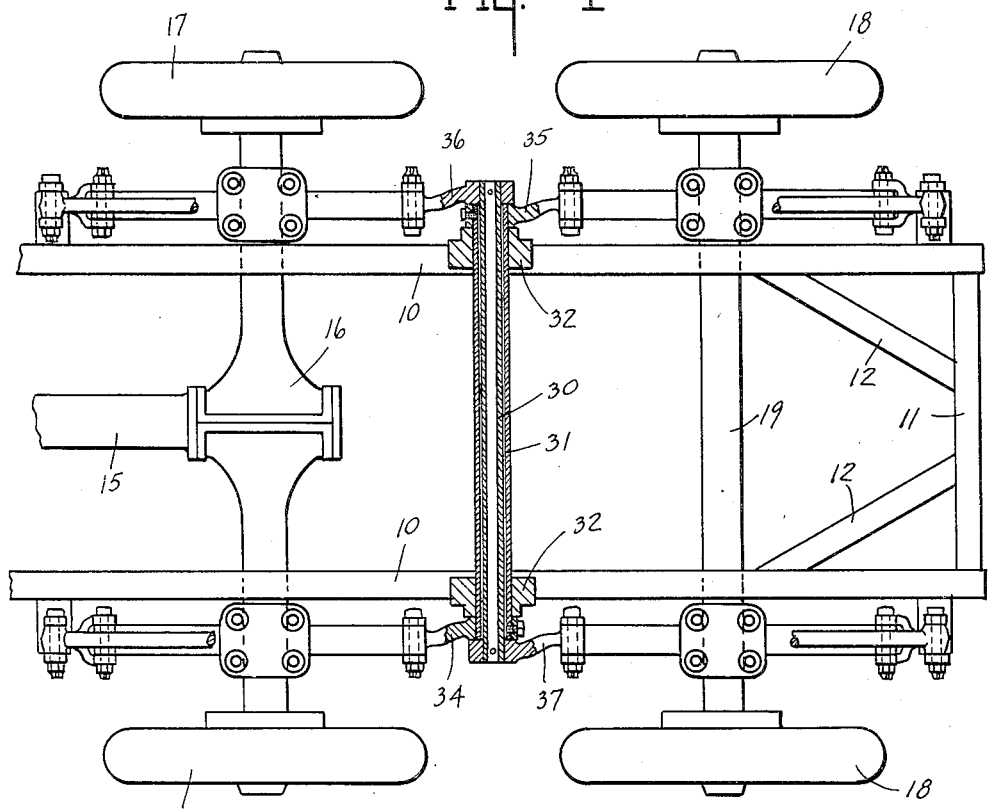
Figure 2:
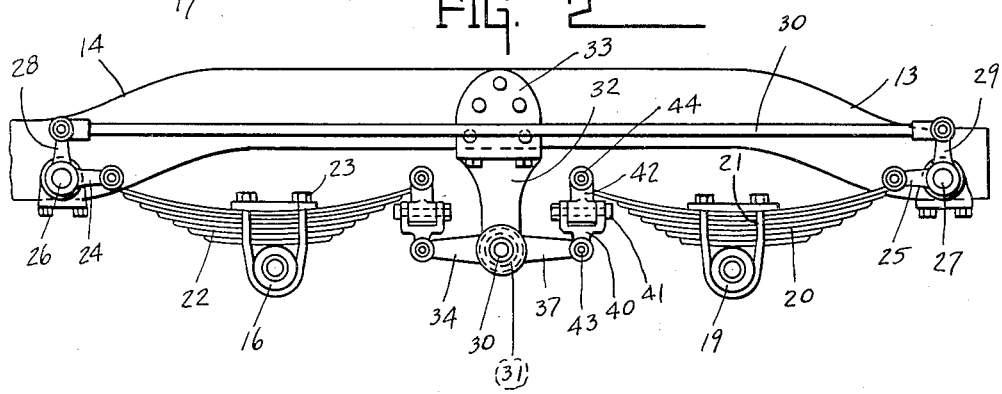

Fig. 1 is a top plan view of a portion of the chassis, parts being broken away to show the same and other parts in central section. Fig. 2 is a side elevation thereof.

In the drawing 10 indicates a pair of spaced frame members suitably connected together as at 11 and 12. The frame may be dropped or raised in any conventional or desired manner as indicated at 13 and 14. 15 indicates the tube inclosing the propeller shaft; 16 indicates the differential housing which incloses a driving mechanism for the driving wheels 17; 18 indicates a pair of wheels positioned on opposite sides of the frame and herein the same are shown in alignment with the wheels 17. The wheels 18 are supported by the axle construction 19. At each side of the frame and adjacent each wheel 18 and herein in superposed relation to the axle 19, is a leaf spring 20 secured as at 21 to the axle construction 19. A similar pair of leaf springs 22 is secured as at 23 to the axle construction 16.

The remote ends of springs 20 and 22 are each pivotally supported upon a pivoted link such as members 25 and 24, respectively, each in turn being pivotally supported as at 27 and 26, respectively. Herein the links 24 and 25 each constitute one arm of a bell crank, the other arm thereof being indicated by the numerals 28 and 29, respectively, and said last mentioned arms are connected together by the rod 30. Rod 30 and arms 28 and 29 may be omitted if desired. Likewise the remote ends of springs 20 and 22 may be otherwise mounted than in the manner herein shown.

The adjacent ends of springs 20 and 22 are not connected together but the adjacent end of one spring 22 is connected to the adjacent end of spring 20 on the opposite side of the frame and similarly the adjacent end of the other spring 20 is connected to the adjacent end of spring 23 upon the opposite side of the frame. The particular type of diagonal or cross connection includes a pair of concentric tubular members 30 and 31, the outer tube 31 being rotatably mounted in bearings 32 supported by the frame as at 33 and the inner tube 30 being rotatably mounted within the outer tube 31. The outer tube 31 projects beyond the bearings 32 but terminate short of the ends of the tube 30. Opposite ends of tube 31 mount lever arms 34 and 35, lever arm 34 being connected to the adjacent end of spring 22 upon one side of the frame and lever arm 35 being connected to the adjacent end of spring 20 upon the opposite side of the frame. Similarly, the projecting ends of tube 30 support lever arms 36 and 37. Lever arm 36 is connected to the adjacent end of spring 22 on one side of the frame and lever arm 37 is connected to the adjacent end of spring 20 upon the opposite side of the frame.

As lever arm 37 moves up in a counterclockwise direction, lever arm 36 moves down in a similar direction. Reverse movement of lever arm 37 secures like reverse movement of lever arm 36. Lever arm 34 moving down in a counterclockwise direction secures upward movement in a counterclockwise movement of lever arm 35 and reverse movement of lever arm 34 secures reverse movement of lever arm 35, so that a movement of any spring and its support is transmitted to the diagonal spring through its support. The movement of any axle is, of course, transmitted across from end to end to a varying degree, depending upon the obstruction encountered or the depression into which the wheel has dropped so that both transverse connecting members 30 and 31 are substantially in motion at all times that the wheels are not traveling upon the level,—in other words, when they are bounding and rebounding.

Each lever arm may be pivotally connected to the adjacent end of the adjacent spring by direct pivotal connection or by a link but herein such connection is shown comprising a hinge construction including the hinge member 40 and hinge member 42 pivotally connected as at 41 upon an axis transverse to the two hinge axes 43 and 44, the former being the connection between the lever arm and the hinge member and the latter being the connection between the hinge member and the adjacent end of the spring.

The two arms 36 and 37 together with tube 30 and two lever arms 35 and 34 together with tube 31, comprise a pair of telescopically associated offset cranks and tubes 30 and 31 are parallel to the supporting axle constructions 16 and 19.

The invention claimed is:

1. An equalizing chassis construction including a tandem arranged pair of paired wheels, an axle for each pair of wheels, a spring supporting each axle near each wheel, means supporting each spring at the remote end, and a pair of coaxial means connecting the inner ends of diagonal opposite springs for equalization purposes.

2. An equalizing chassis construction including a tandem arranged pair of paired wheels, an axle for each pair of wheels, a spring supporting each axle near each wheel, means supporting each spring at the remote end, an offset crank connected to each inner end, and a pair of coaxial means each connected to a pair of oppositely and diagonally positioned cranks for connecting diagonally opposite springs.

3. An equalizing chassis construction including a tandem arranged pair of paired wheels, an axle for each pair of wheels, a spring supporting each axle near each wheel, a bell crank for each spring and having one arm connected to the remote end thereof, a link connecting the other arms of the bell cranks upon the same side of the chassis, and coaxial means connecting the adjacent ends of diagonally opposite springs for equalization purposes.

4. An equalizing chassis construction including a tandem arranged pair of paired wheels, an axle for each pair of wheels, a spring supporting each axle near each wheel, a bell crank for each spring and having one arm connected to the remote end thereof, a link connecting the other arms of the bell cranks upon the same side of the chassis, an offset crank connected to each of the adjacent ends of adjacent springs, and coaxial means connected to said cranks for connecting diagonally opposite springs.

5. An equalizing chassis construction including a tandem arranged pair of paired wheels, an axle for each pair of wheels, a spring supporting each axle near each wheel, a bell crank for each spring and having one arm connected to the remote end thereof, a link connecting the other arms of the bell cranks upon the same side of the chassis, and coaxial means connecting the adjacent ends of diagonally opposite springs for equalization purposes, the connection between the coaxial means and the adjacent spring ends including a hinge, the axis of which is transverse to the pivotal connection.

6. An equalizing chassis construction including a tandem arranged pair of paired wheels, an axle for each pair of wheels, a spring supporting each axle near each wheel, a bell crank for each spring and having one arm connected to the remote end thereof, a link connecting the other arms of the bell cranks upon the same side of the chassis, an offset crank connected to each of the adjacent ends of adjacent springs, and a pair of coaxial arranged means each connected to a pair of diagonally and oppositely positioned cranks for connecting diagonally opposite springs, the connection between each offset crank and the adjacent spring end including a hinge, the axis of which is transverse to the pivotal connection.

In witness whereof, I have hereunto affixed my signature.

JESSE W. CHENOWETH.